(12) United States Patent
Reisch et al.

(10) Patent No.: US 7,448,975 B2
(45) Date of Patent: Nov. 11, 2008

(54) TRANSMISSION DEVICE FOR A VEHICLE

(75) Inventors: Matthias Reisch, Ravensburg (DE);
Martin Grumbach, Heimenkirch (DE);
Ralf Dreibholz, Meckenbeuren (DE);
Wolfgang Schön, Langenargen (DE);
Jürgen Kett, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 323 days.

(21) Appl. No.: 11/371,814

(22) Filed: Mar. 8, 2006

(65) Prior Publication Data

US 2006/0201277 A1    Sep. 14, 2006

(30) Foreign Application Priority Data

Mar. 8, 2005    (DE)    ........................ 10 2005 010 447

(51) Int. Cl.
*F16H 3/72* (2006.01)

(52) U.S. Cl. ............. 475/5; 475/275; 475/278; 475/311; 475/330; 180/65.2; 180/65.4; 180/65.7

(58) Field of Classification Search .................. 475/5, 475/275, 278, 311, 330; 477/3; 180/65.2, 180/65.4, 65.7
See application file for complete search history.

(56) References Cited

U.S. PATENT DOCUMENTS

| | | | |
|---|---|---|---|
| 6,645,105 B2 * | 11/2003 | Kima | 475/5 |
| 6,740,002 B1 * | 5/2004 | Stridsberg | 477/14 |
| 6,966,860 B2 | 11/2005 | Heitmann et al. | |
| 7,056,260 B2 * | 6/2006 | Nakamori et al. | 477/3 |
| 7,244,208 B2 * | 7/2007 | Bauknecht et al. | 475/5 |
| 7,261,665 B2 * | 8/2007 | Friedmann et al. | 475/275 |
| 7,261,671 B2 * | 8/2007 | Ortmann et al. | 477/6 |
| 7,322,900 B2 * | 1/2008 | Ichioka et al. | 475/159 |
| 2005/0038577 A1 * | 2/2005 | Dreibholz et al. | 701/22 |

* cited by examiner

*Primary Examiner*—David D. Le
(74) *Attorney, Agent, or Firm*—Davis Bujold & Daniels, P.L.L.C.

(57) ABSTRACT

A transmission device (3) for a vehicle with an electric machine (26) that is arranged in a housing (11) is described. The electric machine (26) can be placed in active connection with a rotating component (13, 28) that can be guided in the power flow of the transmission device such that a level of torque that can be generated by the electric machine (26) can be transmitted to the component (13, 28). At least one electric component (45; 45Y) that comprises power electronics for the electric machine (26) is arranged in a cross-sectional area inside the housing (11) that is perpendicular to the longitudinal axis of the electric machine (26) and is located directly adjacent to the electric machine (26).

23 Claims, 3 Drawing Sheets

TRANSMISSION DEVICE FOR A VEHICLE

This application claims priority from German Application Serial No. 10 2005 010 447.9 filed Mar. 8, 2005.

FIELD OF THE INVENTION

The invention relates to a transmission device for a vehicle designed to distribute drive torque from a transmission input shaft to at least two vehicle cross shafts.

BACKGROUND OF THE INVENTION

From DE 101 40 424 A1 a transmission device or an automatically shiftable vehicle transmission is known, which is designed with a transmission input shaft that can be placed in active connection with a drive shaft of an internal combustion engine of a vehicle. The vehicle transmission further comprises a transmission output shaft that can be connected to at least one axle of the vehicle. One part of the transmission device, which is designed as a mechanical manual transmission, is engineered with a first planetary gearset and a second planetary gearset, several shifting components and an electric machine, which is provided as a starter-generator and/or for the continuously variable adjustment of the speed-gear ratio of the manual transmission and/or for at least the partial electric driving operation of a vehicle. For this purpose, the electric machine can be connected by way of two additional shifting components to a first shaft or to a second shaft of the first planetary gearset. In addition, the electric machine is associated with an electronic control system and a storage battery in which electric energy that is generated by the electric machine when it is operating in generator mode is temporarily stored.

Ordinarily, the components that are allocated to the electric machine, in other words the electronic control system and the storage battery, are positioned or mounted outside of the housing of a specific transmission device and are connected via electric lines to a coil winding of the electric machine.

One disadvantage of this, however, is that the electric lines that lead from the coil winding of the electric machine to the electronic control system are connected via plug connectors, which result in high manufacturing costs, and which also occupy a significant amount of structural space in the area of the connection contact. Furthermore, the electric lines have an electric resistance that is dependent upon the conductor length and reaches undesirably high levels as the distance between the electric machine and the electronic control system increases. This, in turn, leads to a substantial power dissipation during operation, which causes substantial heat development.

The object of the present invention is thus to provide a transmission device with an electric machine which has a compact design, can be produced cost-effectively, and is characterized in terms of the electric machine by a high degree of efficiency.

SUMMARY OF THE INVENTION

With the transmission device for a vehicle according to the invention, which is designed with an electric machine disposed inside a housing, the electric machine can be placed in active connection with a rotating component that can be guided in the power flow of the transmission device in such a way that a level of torque that can be generated by the electric machine can be transmitted to the component.

According to the invention, at least one power electronic system of the electric component that comprises the electric machine is arranged in a cross-sectional area inside the housing of the transmission device that is located directly adjacent to the electric machine and is perpendicular to the longitudinal axis of the electric machine, so that electric connecting lines between a coil winding of the electric machine and the power electronics can be substantially shorter as compared with known-in-the-art transmission devices.

With this, the level of electrical resistance in the area of connection between the electric machine and the corresponding power electronics can be substantially reduced in a simple manner. In addition, by positioning the power electronics directly adjacent to the electric machine, as specified in the invention, it is possible to electrically conductively connect the ends of the coil wire from the coil winding of the electric machine directly to the power electronics without expensive and cost-intensive plug connectors that are characterized by high contact resistance levels.

The power-transmitting electric lines between the electric machine and the power electronics, which in the transmission device of the invention are shorter than those of traditional transmission devices, result in decreased heat development due to the lower electrical resistance, and improve the electromagnetic compatibility while simultaneously offering a high degree of efficiency.

Furthermore, the levels of contact resistance in the area of connection between the coil winding and the power electronics are decreased, as compared with a traditional plug connection, as a result of the direct linkage of the ends of the coil winding to the power electronics, which further improves the degree of efficiency of the transmission device in terms of the electric machine.

Additionally, the weight of the transmission device is decreased by decreasing the amount of material used in the area of the power wiring between the electric machine and the power electronics, and a housing for the electric component that comprises the power electronics can have a simpler design as compared with traditional transmission devices.

It is also possible to implement the electric machine and the corresponding electric component as a module that can be completed and inspected prior to installation in the housing of the transmission device. A further advantage that results from the modular design of the electric machine and the electric component is that the electric machine and the power electronics can be temperature controlled by way of one common cooling circuit, thus simplifying the structural design of the transmission device.

BRIEF DESCRIPTION OF THE DRAWINGS

The invention will now be described, by way of example, with reference to the accompanying drawings. In the description of the different exemplary embodiments the same reference numerals are used for components having the same structure and function, for purposes of clarity. The drawings show.

DETAILED DESCRIPTION OF THE INVENTION

Figure 1:
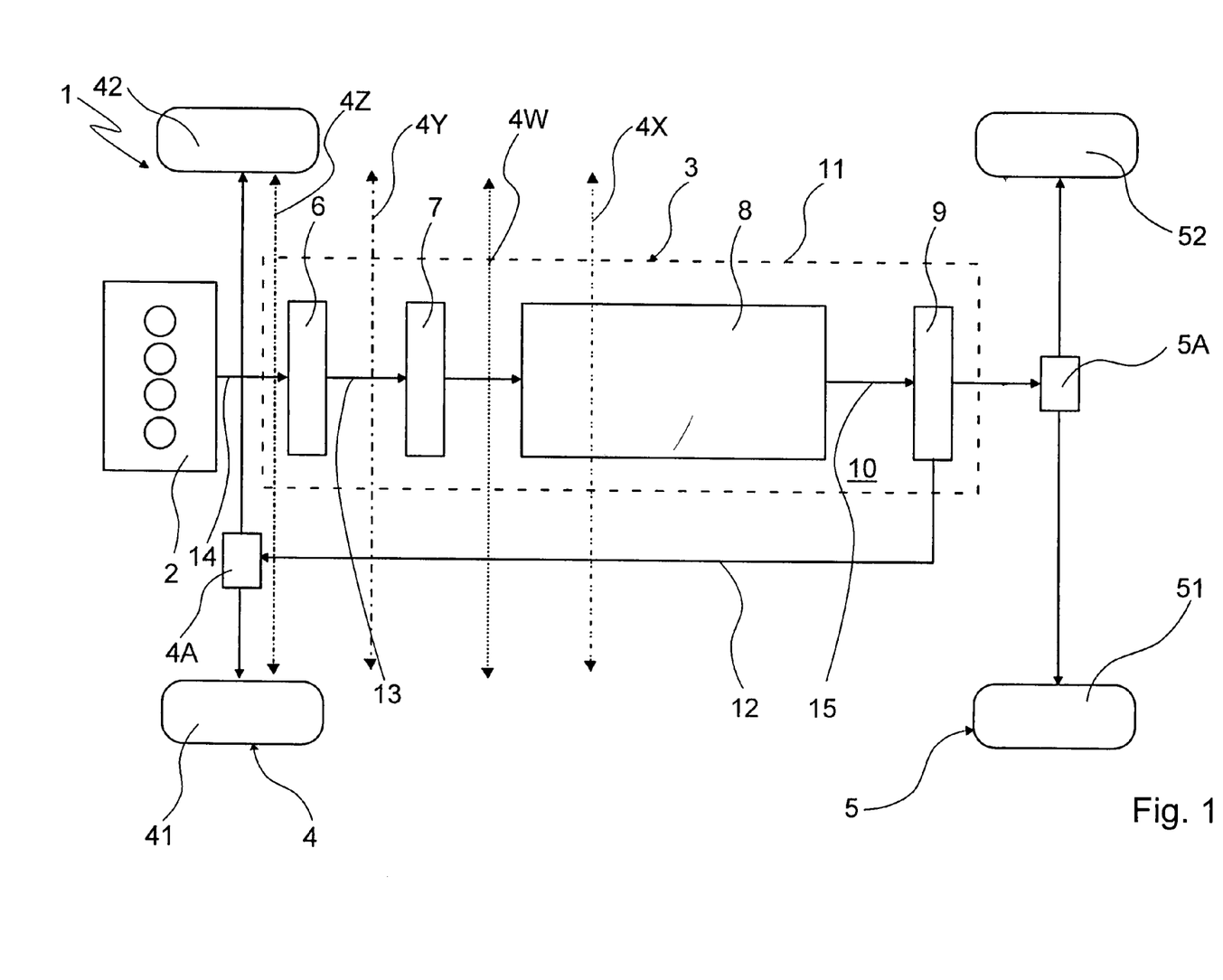
FIG. 1 is a highly schematic block diagram of a drive train of a motor vehicle.

In FIG. 1 a highly schematic block diagram of a drive train 1 of a motor vehicle is shown, which comprises a motor 2, a transmission device 3 and two actuatable vehicle cross shafts 4, 5, wherein the transmission device can be any known transmission device that can be combined in the manner described below with an electric machine.

The transmission device 3 is designed, in this case, with a vibration reduction element 6, a starting element 7, and a manual transmission device 8 for engaging various gear ratios, and a transfer element 9 on the transmission ouput side for distributing drive torque between the two vehicle cross shafts 4 and 5. The vehicle cross shaft 4, which can be designed as a so-called vehicle front axle or as a so-called vehicle rear axle, extends in the present case in a transverse direction relative to the vehicle between the motor 2 and a housing 11, illustrated by a rectangle in dashed lines, for the transmission device 1. The vehicle cross shaft 5 is also positioned outside of the housing 11 and is actively connected to the transfer element 9.

During the traction mode of the drive train 1, the drive torque from the motor 2 is transmitted to the two vehicle cross shafts 4 and 5, via the transmission device 3, at a level defined by the gear ratio of the transmission device 3 at the time. In this, a portion of the transmission output torque is directed by the transfer element 9, in the longitudinal direction of the vehicle, to an axle differential 4A of the vehicle cross shaft 4, and is distributed by the axle differential 4A, in the transverse direction of the vehicle, to two wheels 41, 42 of the vehicle cross shaft 4, as a function of the operational status. At the same time, the remaining portion of the transmission output torque is directed by the transfer element 9, in the longitudinal direction of the vehicle, to an axle differential 5A of the vehicle cross shaft 5, and is distributed by the axle differential 5A in the transverse direction of the vehicle to two wheels 51 and 52 of the vehicle cross shaft 5, as a function of the operational status. The transfer element 9 and the axle differential 4A of the vehicle cross shaft 4 are actively connected via a guide shaft 12 that extends in the longitudinal direction of the vehicle.

During a trailing throttle operation of the drive train 1, torque is transmitted in the drive train 1 starting from the vehicle's cross shafts 4 and 5, via the transmission device 3 in the direction of the motor 2, where it is at least partially absorbed.

Of course, an expert in the field may also choose to extend the vehicle cross shaft 4, in contrast to the arrangement shown in FIG. 1 between the vibration reduction component 6 and the starting element 7 in a longitudinal direction relative to the vehicle, at a different location through the housing 11 of the transmission device 3 or even past the outside of the housing 11, in a transverse direction relative to the vehicle, as a function of the intended application. In FIG. 1, by way of example, four alternative arrangements for the vehicle cross shaft 4 are shown as reference numerals 4W, 4X, 4Y and 4Z, which are described in greater detail below.

Figure 2:
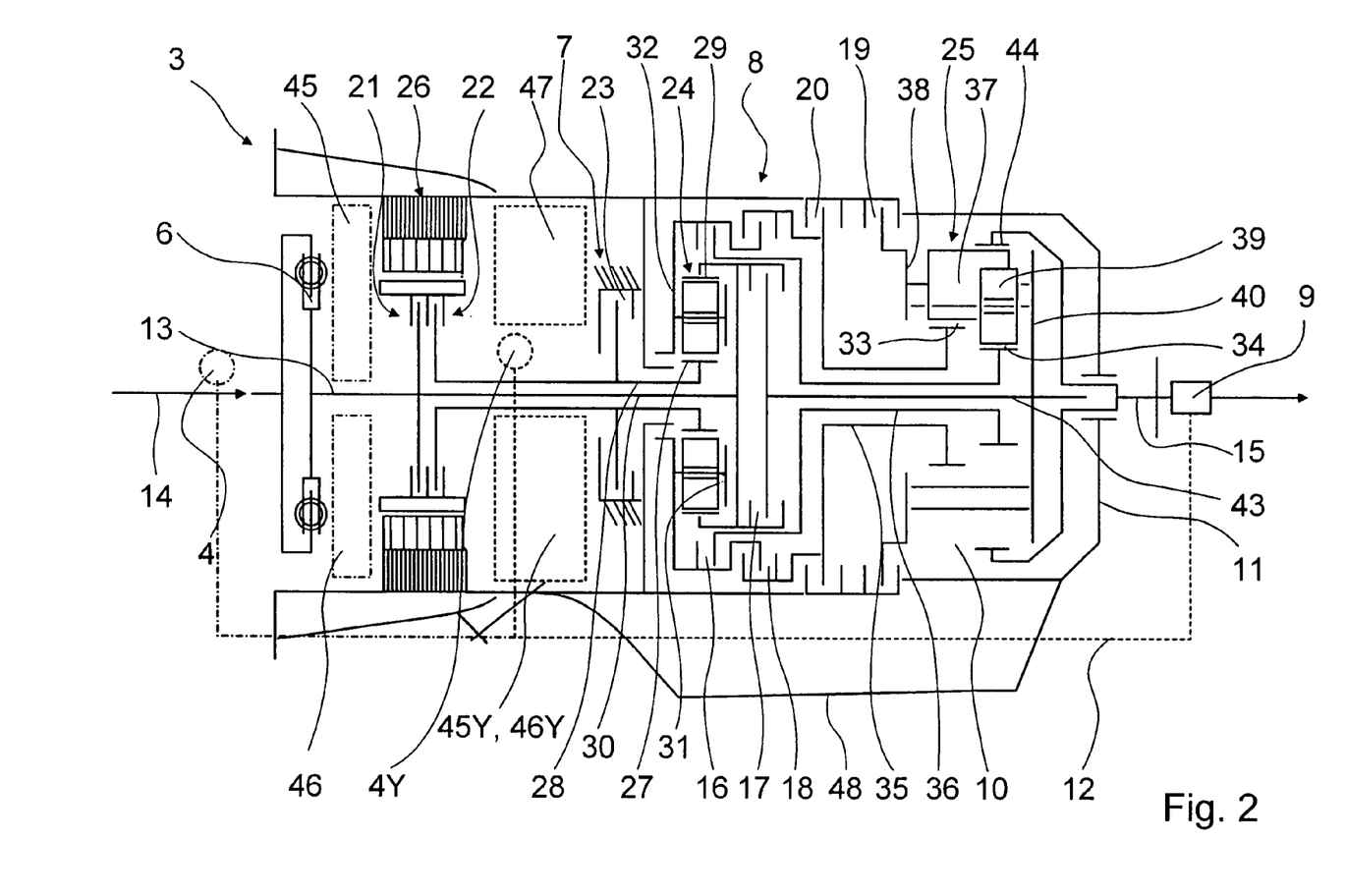
FIG. 2 is a gear diagram for a first exemplary embodiment of a transmission device implemented according to the invention.

FIG. 2 shows a gear diagram for a first embodiment of the transmission device 3, which in FIG. 1 is depicted in a highly schematized form, and which is an automatically shiftable transmission device for vehicles, especially for motor vehicles.

The stepped shiftable transmission device 3 comprises, among other things, a transmission input shaft 13 that is actively connected on the input side to the vibration reduction element 6, which is designed as a torsion damper element, with the input shaft being positioned above the vehicle cross shaft 4 relative to an undersurface of the vehicle when the transmission device 3 is installed. On the side of the vibration reduction element 6 that faces away from the transmission input shaft 13, a motor output shaft 14 is provided, so that the transmission input shaft 13 is in active connection with the motor output shaft 14 via the vibration reduction element 6. On the output side, the transmission device 3 is designed with a transmission output shaft 15 which, when the transmission device 3 is installed, is in active connection with the vehicle cross shafts 4 and 5 shown in FIG. 1, via the transfer element 9.

Between the transmission input shaft 13 and the transmission output shaft 15, a number of shifting components 16 through 23, a first planetary gearset 24, a second planetary gearset 25, and an electric machine 26 are provided as transmission components for the purpose of implementing a variety of gear ratios. The first planetary gearset 24, which is designed in this case as a simple planetary gearset, is connected upstream from the second planetary gearset 25, which is designed as a Ravigneaux planetary gearset.

With the transmission design shown in FIG. 2, for example, a multi-ratio automatic transmission for a motor vehicle with six forward gears and one reverse gear can be implemented, wherein by actuating the shifting components 16 through 23 and the electric machine 26, based upon the operating status existing at a given time, an overall gear ratio of the transmission device 3 that is selected via a transmission control device can be engaged or an overall gear ratio of the transmission device 3 that is selected by the driver can be engaged.

A sun gear 27 of the first planetary gearset 24 is connected via a sun gear shaft 28 to the shifting component 23, which is designed as a starting brake, and which represents the starting element 7, so that a vehicle that is equipped with the transmission device 3 can be started up without a hydrodynamic torque converter. The electric machine 26 in this case is designed as a starter and generator component that is equipped with an electric component 45, which is located on the side of the housing, within a cross-sectional area inside the housing 11 of the transmission device 3 that is perpendicular to the longitudinal axis of the electric machine 26, and which comprises the power and control electronics for the electric machine 26. The electric machine 26 is connected, via the power electronics of the electric component 45, to another component 46 of the electric component 45, which is also located within the cross-sectional area of the transmission device 3 and is designed as an energy storage unit.

The integration of the electric machine 26 in the transmission device 3 makes it possible for a vehicle that is equipped with the transmission device 3 to be started from a "geared neutral" operating stage. Furthermore, the arrangement of the electric component 45 with the power and control electronics and with the energy storage unit 46 in the cross-sectional area makes it possible to design the electric machine 26 and the corresponding electric component 45 with the energy storage unit 46 as a pre-assembled module, the function of which can be easily tested prior to assembly and which during assembly of the transmission device 3 can be easily installed in the housing 11 of the transmission device 3 during a single assembly step. This leads advantageously to a simplification of assembly and furthermore to decreased warehousing costs, as only a single compact modular component needs to be stored.

Furthermore, because the electric component 45 is located with the energy storage unit 46 in the housing 11 of the transmission device 3, the transmission device 3 is characterized by a compact design and the exterior shape of the housing 11 allows it to be more easily integrated into the structural space of a vehicle that is available for the drive train than is the case with traditional transmission devices in which the power electronics are arranged outside of the housing.

Between the electric machine 26 and the first planetary gearset 24 a first shifting component 21, which is designed as a frictionally engaged clutch, and a second shifting component 22, also designed in axial direction of the transmission input shaft 13 as a frictionally engaged clutch, are disposed, via which the electric machine 26, when engaged, can be placed in active connection with an annular gear 29 or the sun gear shaft 28 of the first planetary gearset 24, respectively.

Thus, for example, to start the motor 2, which is in active connection with the transmission input shaft 13 and is implemented as an internal combustion engine, the second shifting component 22 is engaged, and a starter torque that is applied by the electric machine 26 is introduced via the sun gear shaft 28 to the first planetary gearset 24. In this manner, the starter torque from the electric machine 26, which is transmitted to the transmission input shaft 13 and from there to the crankshaft of the motor, is doubled.

During driving operation, based upon a speed-variable engagement of the electric machine 26 with the sun gear shaft 28, not only seven forward gears with fixed gear ratios, but also five forward gear ranges with continuously variable gear ratios may be selected. Furthermore, it is advantageously possible to perform an energy recuperation during driving operation, especially during braking via the electric machine 26 and to intermediately store the electrical energy generated by the electric machine 26, which is then operating as a generator, in the energy storage unit 46, which is connected to the electric machine 26.

In addition, with a vehicle that is designed with the transmission device 1 of the invention, emission-free electric driving operation in a forward travel direction and in a reverse travel direction, as would occur, for example, when maneuvering in urban areas, is possible.

The positioning of the first shifting component 21 and the second shifting component 22 makes it possible to connect the electric machine 26 to the transmission input shaft 13 via the first shifting component 21, once the motor 2 has been started. The transmission input shaft 13 is then directly connected to the motor output shaft 14 of the motor 2.

In this operating state of the transmission device 3, it is advantageously possible for the driver to obtain an increase in the torque produced by the internal combustion engine when desired, thus enabling a so-called boost operation. In addition, with this type of interconnection of the components in the transmission device 3, a permanent supply of electricity from the on-board power supply is available when the electric machine 26 is operating as a generator. If both the first shifting component 21 and the second shifting component 22 are engaged at the same time, the first planetary gearset 24 is interconnected so that, by combining the first planetary gearset 24 and the second planetary gearset 25, two additional forward gears and one additional reverse gear can be engaged.

The annular gear 29 of the first planetary gearset 24 is permanently connected via an internal gear shaft 30 to the transmission input shaft 13. Planetary gears 31 of the first planetary gearset 24 are connected to a planet carrier 32 which, in turn, can be connected via the shifting components 16, 17 and 18 to the second planetary gearset 25 or can be interlocked, via the shifting component 20 which is designed as a brake, with the housing 11 of the transmission device 3.

The second planetary gearset 25 comprises essentially a first sun gear 33 and a second sun gear 34, which can be connected via a first sun gear shaft 35 and via a second sun gear shaft 36 to the first planetary gearset 24, or can be interlocked with the housing 11 via the brake 20. A set of first planetary gears 37 is supported on a first planet carrier 38 of the second planetary gearset 25, which can be interlocked with the housing 11 by way of the brake 19. Both the first planetary gears 37 and second planetary gears 39 can be connected via a second planet carrier 40 and an intermediate shaft 43 to the first planetary gearset 24. The annular gear 44 of the second planetary gearset 6 is directly connected to the transmission output shaft 15 of the transmission device 3.

The arrangement shown in FIG. 2 of the electric machine 26 and the electric component 45 that operates in conjunction with it offers the advantage that, as compared with cases in which the power electronics are arranged outside of the transmission device 3, substantially shorter power supply lines are possible for the active connection between these two components. As a result of the lower resistance in the power supply lines, decreased heat development and a decreased electromagnetic compatibility problem are achieved, along with a simultaneously high level of efficiency. In addition, production costs and the weight of the arrangement are decreased, since in the area of the active connection between the electric machine 26 and the electric component 45 the amount of materials required is reduced.

Thus the positioning of the power electronics adjacent to the electric machine 26 makes it possible to connect the ends of the coil winding of the electric machine 26, which preferably is comprised of multiple coil sections, to the power electronics of the electric component by way of cost-effective rivet joints, threaded connections, weld joints, soldered joints, adhesive joints, joints that are produced by bonding or pressure-based bonds, such as clamp joints, for example, all of which are characterized by lower transition resistances.

To this end, it is possible to connect the coil sections of the coil winding of the electric machine 26 to the power electronics in the above-described manner, based upon the specific application, in series and/or parallel connection, separately or combined in partial coil groups, and then to actuate them together.

If the coil sections of the electric machine 26 are directly coupled to the mounting plate for the power electronics, a costly combination of the coil currents is advantageously eliminated when the coil sections are connected in parallel and the coil sections can then also be separately controlled.

Furthermore, an expert in the field may also decide to electrically connect the unattached ends of the coil section wires in the above-proposed manner to semiconductors in the power electronics and then to control the semiconductors in such a way that the coil sections are electrically interconnected with one another to an extent that is necessary for the operation of the electric machine. This means that the series and/or parallel connection of the coil sections in a coil group takes place first in the area of the power electronics, with this approach being particularly advantageous in the case of a parallel connection of the coil sections.

As an alternative to interconnecting individual coil sections of the coil winding of the electric machine in the area of the power electronics, it is also possible to position coil sections directly in the area of the electric machine 26 in an arrangement that is necessary for the operation of the electric machine 26, with this approach being more advantageous if the coil sections are series-connected.

The grouping of coil sections makes it possible to connect only a single coil section of each coil group to a current measuring device for determining the coil section currents in a coil group, since the coil currents for the coil sections of a coil group are identical with proper interconnection of the coil sections.

However, it can also be provided that a portion of the coil sections of the coil winding in the area of the electric machine 26 and the other portion in the area of the power electronics are interconnected with one another via the necessary method and manner.

If the coil sections of the coil winding of the electric machine 26 are all interconnected in parallel with one another, the unattached coil wire ends of the coil sections, each of which then represents a coil section group, are advantageously directly connected to the power electronics of the electric component 45, which is positioned adjacent to the electric machine 26, without the intermediate connection of additional electric lines. It is then possible, in a simple method and manner, to connect the ends of the coil wires as desired via one of the above-mentioned connections, directly to a mounting plate for the power electronics or to electrically link them, via a bond connection, directly to a semiconductor arranged on the mounting plate.

The latter electrically conductive active connection between the ends of the coil wires and the semiconductors of the power electronics offers the advantage that, in contrast to linking the ends of the coil wires to the mounting plate, no additional lines are required between the semiconductor elements and the ends of the coil wires. This, in turn, advantageously decreases electrical resistance between the semiconductor elements and the ends of the coil wires, as one contact point less exists.

In contrast to the completely separate linkage of the coil sections to the power electronics, the coil sections of the coil winding can be symmetrically interconnected with one another in such a way that the number of coil section groups is reduced to a minimum and only three coil section groups are present, which then form the three phases of the electric machine and are electrically connected to the power electronics.

In general, the connections between the ends of the coil wires and the power electronics are designed to be elastic enough that variations in operating temperature and dynamic loads in the area of the connection can be compensated for.

In addition, the electric machine 26 and the power electronics are firmly connected to one another in the area of rigid support elements, with variations in operating temperature and dynamic loads in the area of this connection also being compensated for in a suitable method and manner.

Further, a housing for the electric component 45 can be simpler in design as compared with traditional transmission devices; the housing 11 of the transmission device 3 also shields other component groups of a vehicle against the electromagnetic waves emitted by the electric machine 26 and the electric component 45.

Because the electric component 45 also comprises the control electronics in addition to the power electronics, the electric component 45 is connected, via only two power contacts and one data connector, to a main control device of the vehicle in which comprehensive drive train management takes place.

Furthermore, in FIG. 2 an alternative to the above-described arrangement of the vehicle cross shaft 4 through the transmission housing 11 of the transmission device 3 is shown, which is described in greater detail as reference numeral 4Y and is indicated in the graphic by the dashed line.

The vehicle cross shaft 4Y is positioned between the electric machine 26 and the manual transmission device 8, wherein within the cross-sectional area that is perpendicular to the longitudinal axis of the transmission device 3 and to the longitudinal axis of the electric machine 26 and that is inside the housing 11 of the transmission device 3 in which the vehicle cross shaft 4Y is positioned. The electric component 45, which previously was located between the vibration reduction element 6 and the electric machine 26, the energy storage unit 46, and at least a part of a temperature control system 47 located on the housing side are arranged, so that the cross-sectional area that cannot be occupied by rotating transmission components is entirely utilized. In this, the alternative positioning of the electric component is described in greater detail as reference numeral 45Y, and the energy storage unit is described in greater detail as reference numeral 46Y.

In the present case, the temperature control device 47 comprises a distributor that is arranged in the cross-sectional area, which can be designed, for example, as a valve, a slide valve, a diaphragm or some similar element for distributing fluid circulating in the temperature control device, via which thermal energy can be directed into the housing 11 of the transmission device 3 or out of the housing 11 of the transmission device 3.

Additionally, it can be provided that the distributor may be controlled or regulated, to allow the fluid circulating in the temperature control device 47 to be distributed as needed.

It may also be provided that in the cross-sectional area of the transmission device 3 in which the vehicle cross shaft 4Y is arranged, fluid currents circulating within the housing 11 are combined and from there are delivered out of the transmission device 3 via a single line.

Furthermore, in the cross-sectional area of the transmission device 3 in which the vehicle cross shaft 4Y is arranged, the electric component 45Y with the power and control electronics, which operates in conjunction with the electric machine 26, and the energy storage unit 46Y for the electric component 45Y, which is actively connected to the electric machine via the power and control electronics, are arranged and are temperature controlled via the same temperature control circuit as the electric machine 26.

Of course, an expert in the field can decide whether to control the temperature in the electric machine 26, the electric component 45Y and the energy storage unit 46Y along with other components of the transmission device 3 via separate temperature control circuits or via temperature control circuits that are coupled to one another. In this, the power electronics of the electric machine 26, the shifting components 16 through 23, and other rotating transmission components of the transmission device 3 can be temperature controlled via one common temperature control circuit; the electric machine 26 can also be temperature controlled via this temperature control circuit or via a separate temperature control circuit. Of course, the electric machine 26 and the rotating transmission components can also be temperature controlled via one common temperature control circuit.

In addition to the electric component and the temperature control device, it is also possible to position an electric transmission control device which, in conventional transmission devices, is ordinarily positioned within a pan 48 provided on the underside of the housing 11 of the transmission device 3 when the transmission device 3 is installed inside the housing 10, so that the pan 48 can be implemented with smaller dimensions in a longitudinal direction relative to the transmission device 3 or in a circumferential direction relative to the transmission device 3 as compared with known transmission devices, so that a transmission device 3 of this design has a smaller space requirement.

The above-described temperature control devices can preferably be operated with water as the cooling or heating medium, whereas for cooling and lubricating the rotating transmission components hydraulic fluid is used in a known method and manner. This means that the temperature control device and the cooling and lubricating circuit for controlling the temperature of the shifting components 16 through 23 are designed to be separate. For the exchange of heat between the two circuits, a heat exchanger is provided in the cross-sectional area of the vehicle transverse axis of the transmission device and the planetary gearsets 24 and 25, which is not depicted in greater detail in the drawing, by way of which thermal energy can be exchanged between the water circulating in the temperature control device and the hydraulic fluid.

Thus, especially when a motor vehicle is being started up, it is possible for the temperature of the hydraulic fluid that has been circulating in the cooling and lubricating circuit in the area of the heat exchanger to be raised as rapidly as possible to a desired operating level via the addition of thermal energy, and then cooled via the appropriate control and regulation using the water that is circulating in the temperature control device, thus adjusting it to, or maintaining it at, the proper operating temperature for a problem-free function of the transmission device 3.

Furthermore, in a further advantageous improvement of the transmission device of the invention that is not illustrated in greater detail here, it is provided that the above-described temperature control device can also be positioned inside the housing 10 of the transmission device 3 in the position shown in FIG. 2 when the vehicle cross shaft is arranged extending outside of the housing of the transmission device 3 in the transverse direction of the vehicle, wherein the electric component 45 and/or the energy storage unit 46 can be arranged, as desired, on the same side of the electric machine 26 as the temperature control device 47 or on the other side of the electric machine 26.

It is also possible to position at least one sensor device for determining the rotational speed, determining the temperature, and/or determining electric variables inside the housing 10 of the transmission device 3, in the cross-sectional area in which the power electronics and/or the temperature control device are arranged, whereby a desired compact design for the transmission device 3 is also achieved.

Figure 3:
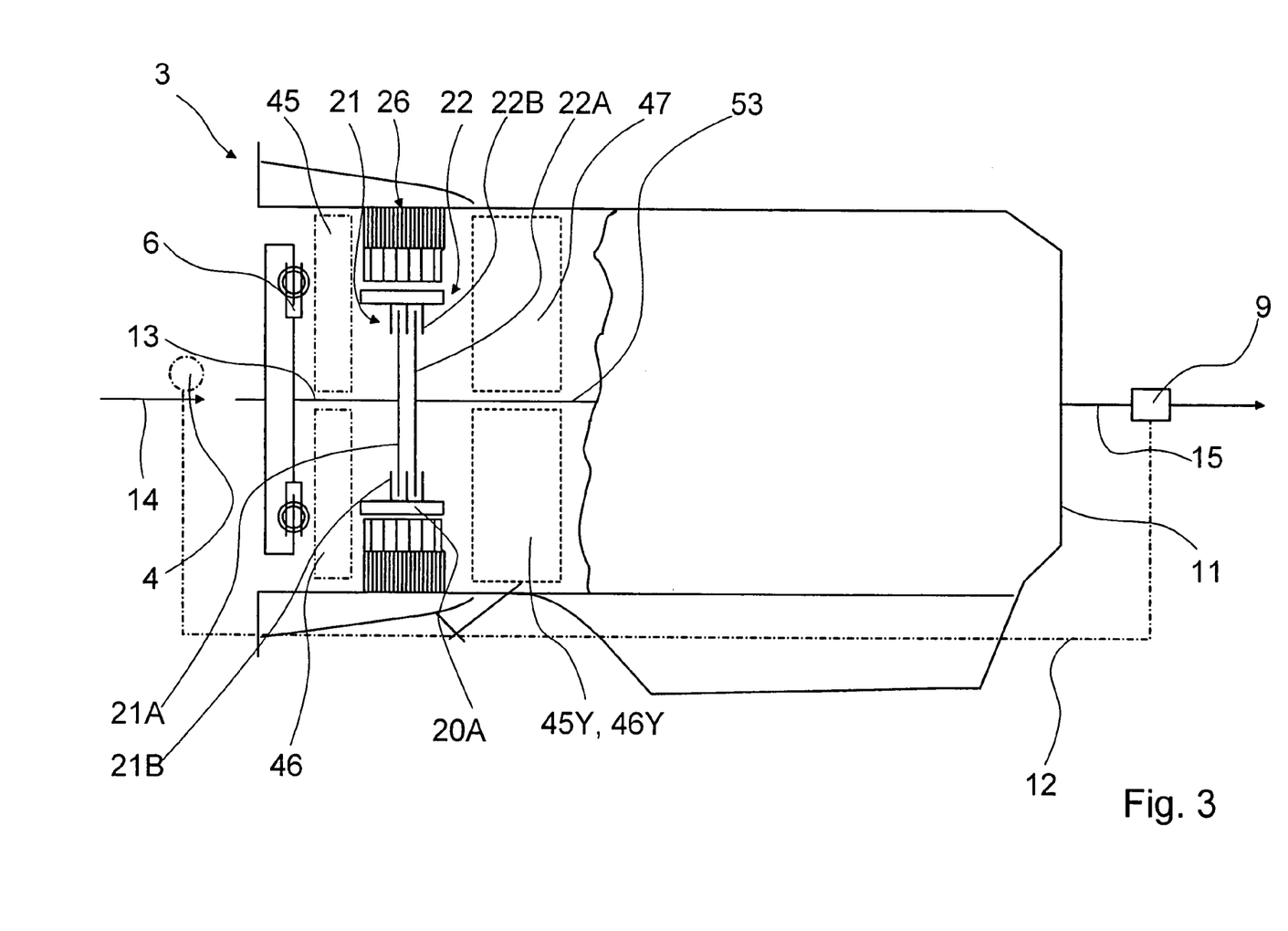
FIG. 3 is a schematic partial sectional view of a second exemplary embodiment of a transmission device according to the invention.

FIG. 3 shows a partial sectional view of a second exemplary embodiment of a transmission device 3 designed according to the invention, which differs from the exemplary embodiment of FIG. 2 in terms of the inlet area of the transmission device 1, in the shifting area, by which the gear ratio of the transmission device 3 is changed, and in terms of the positioning of the vehicle cross shaft 4.

In the transmission device 3 shown in FIG. 3, the transmission input shaft 13 is connected to an internal disk carrier 21A of the first shifting component 21. Further, an external disk carrier 21B is connected to the external disk carrier 22B of the second shifting component 22 and to a rotor 26A of the electric machine 26 as a single part. An internal disk carrier 22A of the second shifting component 22 is non-rotatably connected to a central transmission shaft 53 that extends in the direction of the shifting area.

With this, the motor 2 is connected to the vehicle cross shafts 4 and 5 that extend in a transverse direction relative to the vehicle, outside of the transmission housing 11, only if the transmissibility of the shifting components 21 and 22 is adjusted such that the drive torque of the motor 2 applied via the transmission input shaft 13 can be transmitted via the internal disk carrier 21A, the external disk carrier 21B and/or 22B and the internal disk carrier 22A of the second shifting component 22 to the central transmission shaft 53. This means that the two shifting components 21 and 22 are in at least a torque-transmitting slip operation or in a loss-free, in other words a slip-free, status.

If the first shifting component 21 is completely engaged and the second shifting component 22 is completely disengaged, only an active connection exists between the electric machine 26 and the drive motor 2, so that either the motor 2 can be driven by the electric machine 26, for example, to start the motor 2, or an energy storage unit for the electric machine 26 can be recharged by the motor 2 when the electric machine 26 is functioning as a generator.

If the two shifting components 21 and 22 are controlled in such a way that the first shifting component 21 is present with transmissibility, that no torque can be transmitted via the first shifting component, and that via the second shifting component 22 an applied torque can be transmitted in the direction of the electric machine 26 or in the direction of the transmission output of the transmission device 3, it is advantageously possible to electrically drive a vehicle that is equipped with the transmission device 3, or to apply deceleration torque at the output of the vehicle when the electric machine 26 is functioning as a generator.

As an alternative to the transmission device 3 shown in FIG. 2, the transmission device 3 of FIG. 3 is implemented, in a method and manner that is not illustrated in detail, with a transmission component by means of which a gear ratio of the transmission device 3 can be continuously varied. To achieve this, a variator with a thrust belt is provided, which is known in the art and not illustrated in greater detail. Of course, based upon the specific application, a specialist in the field may choose to provide a different transmission component, by means of which the gear ratio of the transmission device 3 can be continuously varied.

Furthermore, in another advantageous embodiment of the transmission device of the invention, which is not depicted in detail here, it is provided that the transmission device is designed both with transmission components that will allow the stepped adjustment of the gear ratio of the transmission device and with at least one transmission component for the continuous variation of the gear ratio. The gear ratio of a transmission device of this type is continuously variable in at least one gear ratio range.

As an alternative to the above-described exemplary embodiments of the transmission device of the invention, or in combination with these, it can also be provided that at least a part of an electric component, designed as an electric transmission control device or as an electrohydraulic transmission control device, is arranged in the cross-sectional area that extends perpendicular to the longitudinal axis of the electric machine and/or perpendicular to the longitudinal axis of the transmission device, in which the actuatable vehicle cross shaft extends through the housing of the transmission device, inside the housing of the transmission device. In this case, an electrohydraulic transmission control device may comprise pressure regulators, such as solenoid valves and the associated electronics, or valves that are installed downstream from a pressure regulator, such as proportional solenoid valves and similar elements.

REFERENCE NUMERALS 1 drive train
2 motor
3 transmission device
4 vehicle cross shaft
4A axle differential
4X, 4Y, 4Z vehicle cross shaft
5 vehicle cross shaft
5A axle differential
6 vibration reduction element 7 starter element
8 manual transmission device
9 transfer element
10 interior of the transmission device
11 transmission device housing
12 guide shaft
13 transmission input shaft
14 motor output shaft
15 transmission output shaft
16 shifting component
17 shifting component
18 shifting component
19 shifting component
20 shifting component, brake
21 shifting component, clutch
21A internal disk carrier
21B external disk carrier
22 shifting component, multi-disk clutch
22A internal disk carrier
22B external disk carrier
23 shifting component, starting brake
24 first planetary gearset
25 second planetary gearset
26 electric machine
26A rotor
27 sun gear of the first planetary gearset
28 sun gear shaft
29 annular gear of the first planetary gearset
30 internal gear shaft
31 planetary gears of the first planetary gearset
32 planet carrier for the first planetary gearset
33 first sun gear of the second planetary gearset
34 second sun gear of the second planetary gearset
35 first sun gear shaft of the second planetary gearset
36 second sun gear shaft of the second planetary gearset
37 first planetary gears of the second planetary gearset
38 first planet carrier of the second planetary gearset
39 second planetary gears of the second planetary gearset
40 second planet carrier of the second planetary gearset
41, 42 wheel
43 intermediate shaft
44 annular gear of the second planetary gearset
45, 45Y electric component
46, 46Y energy storage unit
47 temperature control device
48 pan
51, 52 wheel
53 central transmission shaft

The invention claimed is:

1. A transmission assembly (3) for a vehicle comprising:
a transmission housing (11);
at least one rotating shaft (13, 28; 53) axially passes longitudinally through the transmission housing (11) for transmitting rotational drive;
an electric machine (26) being located within the transmission housing (11) and being actively connectable with the at least one rotating shaft (13, 28; 53) so that torque, generated by the electric machine (26), can be supplied and guided through the transmission via the at least one rotating shaft (13, 28; 53);
wherein an electrical component (45; 45Y), which includes power electronics for powering the electric machine (26), is axially located within the transmission housing (11), directly adjacent the electric machine (26), such that the electrical component (45; 45Y) are located, within a cross-section area within the transmission housing (11) which extends perpendicular to a longitudinal axis of the electric machine (26).

2. The transmission assembly (3) according to claim 1, wherein the electrical component (45; 45Y) is located on a side of the transmission housing (11) separate from a manual transmission device (8) and adjacent an input shaft (13) of the transmission housing (11).

3. The transmission assembly (3) according to claim 1, wherein the electrical component (45; 45Y) further comprises control electronics to control the electric machine (26).

4. The transmission assembly (3) according to claim 1, wherein an electrohydraulic transmission control device is located within the transmission housing (11).

5. The transmission assembly (3) according to claim 1, wherein the electrical component (45; 45Y) also includes an energy storage unit (46, 46Y) that drives the electric machine (26).

6. The transmission assembly (3) according to claim 1, wherein the electric machine (26) and the power electronics are firmly connected with one another in an area of rigid support elements.

7. The transmission assembly (3) according to claim 1, wherein at least one sensor device located within the transmission housing (11).

8. The transmission assembly (3) according claim 1, wherein the transmission assembly (3) further comprises transmission shifting components (16 through 23) which engage and disengage transmission gears (24, 25) to shift between different stepped transmission gear ratios.

9. The transmission assembly (3) according to claim 1, wherein at least one transmission element is located within the transmission housing (11) to continuously vary a transmission gear ratio within a range of transmission gear ratios.

10. The transmission assembly (3) according to claim 1, wherein an electric transmission control device is located within the transmission housing (11).

11. The transmission assembly (3) according to claim 10, wherein a temperature control device (47) is located within the transmission housing (11) on a side of the transmission housing (11) which is separate from a manual transmission device (8).

12. The transmission assembly (3) according to claim 11, wherein the temperature control device (47) controls a temperature of hydraulic fluid located in the transmission housing (11).

13. The transmission assembly (3) according to claim 11, wherein the temperature control device (47) controls a temperature of at least one of the power electronics and the control electronics of the electrical component (45; 45Y).

14. The transmission assembly (3) according to claim 11, wherein the temperature control device (47) controls a temperature of the electric machine (26).

15. The transmission assembly (3) according to claim 11, wherein the temperature control device (47) comprises a distributor element for at least one of distributing and combining flow of a transmission medium circulating in the temperature control device (47).

16. The transmission assembly (3) according to claim 15, wherein the distributor element is at least one of controlled and regulated.

17. The transmission assembly (3) according to claim 1, wherein the electric machine (26) includes a coil winding having multiple coil sections and unattached ends which are electrically directly connected to the power electronics.

18. The transmission assembly (3) according to claim 17, wherein a current-measuring device is located within the transmission housing (11) and communicates with the power electronics to determine coil section currents flowing into the coil sections during operation of the electric machine (26).

19. The transmission assembly (3) according to claim 17, wherein the direct electrical connections between the coil winding and the power electronics are flexible to compensate for variations in a connection area due to operating temperatures and dynamic loads.

20. The transmission assembly (3) according to claim 17, wherein the direct electrical connections between the coil winding and the power electronics is a bond connection.

21. The transmission assembly (3) according to claim 1, wherein the electric machine (26) includes a coil winding having multiple coil sections which are combined into at least three coil section groups, and each of the at least three coil section groups is electrically directly connected to the power electronics.

22. The transmission assembly (3) according to claim 21, wherein the multiple coil sections that are combined into the at least three coil section groups that are arranged one of in series and parallel with respect to one another.

23. A transmission assembly (3) for a vehicle comprising:

a transmission housing (11);

at least one rotating shaft (13, 28; 53) axially passes longitudinally through the transmission housing (11) for transmitting rotational drive;

an electric machine (26) being located within the transmission housing (11) and being actively connectable with the at least one rotating shaft (13, 28; 53) so that torque, generated by the electric machine (26), can be supplied and guided through the transmission via the at least one rotating shaft (13, 28; 53);

wherein an electrical component (45; 45Y), which includes power electronics for powering the el6ctric machine (26), is axially located within the transmission housing (11)1 directly adjacent the electric machine (26), such that the electrical component (45; 45Y) are located, within a cross-section area within the transmission housing (11) which extends perpendicular to a longitudinal axis of the electric machine (26), and at least one axle drive shaft (4W; 4X; 4Y; 4Z) passes through an interior (10) of the transmission housing (11) perpendicular to a longitudinal axis of the electric machine (26).

* * * * *